United States Patent
Hobbett et al.

(10) Patent No.: US 8,886,962 B2
(45) Date of Patent: Nov. 11, 2014

(54) SYSTEMS AND METHODS FOR DISK ENCRYPTION WITH TWO KEYS

(75) Inventors: Jeffrey R. Hobbett, Holly Springs, NC (US); Takashi Sugawara, Tokyo (JP); David C. Challener, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 734 days.

(21) Appl. No.: 12/750,053

(22) Filed: Mar. 30, 2010

(65) Prior Publication Data

US 2011/0246784 A1 Oct. 6, 2011

(51) Int. Cl.
*G06F 21/00* (2013.01)
*G06F 21/80* (2013.01)
*H04L 9/08* (2006.01)
*G06F 21/72* (2013.01)

(52) U.S. Cl.
CPC ............... *G06F 21/72* (2013.01); *G06F 21/80* (2013.01); *H04L 9/088* (2013.01); *H04L 9/0894* (2013.01); *G06F 2221/2107* (2013.01); *G06F 21/00* (2013.01)
USPC .......................................... 713/193; 380/259

(58) Field of Classification Search
CPC ............... G06F 21/60; G06F 12/1408; G06F 2221/2107; G06F 21/62
See application file for complete search history.

(56) References Cited

U.S. PATENT DOCUMENTS

2008/0240428 A1* 10/2008 Hobbet et al. ................ 380/45
2010/0299555 A1* 11/2010 Jepson et al. ................. 714/5

* cited by examiner

*Primary Examiner* — Izunna Okeke
(74) *Attorney, Agent, or Firm* — Ference & Associates LLC

(57) ABSTRACT

Embodiments provide for using two encryption keys to encrypt data instead of only one as is customarily used in the industry. According to various embodiments, a default encryption key is generated and is initially used to encrypt data, while a second encryption key is available for generation by an end user. Embodiments provide that data is encrypted with the default key until the user generates their own key, after this event, all data is encrypted with key generated by the user.

20 Claims, 4 Drawing Sheets

SYSTEMS AND METHODS FOR DISK ENCRYPTION WITH TWO KEYS

BACKGROUND

The subject matter described herein generally relates to the encryption of hard disk drives (HDD) utilizing encryption keys, such as through encryption software programs or dedicated encryption hardware.

Due to data security concerns, there is a strong push in the industry for improved data encryption solutions. For example, a Full Disk Encryption (FDE) HDD is the result of combining a standard HDD with an encryption key built into the HDD Printed Circuit Board Assembly (PCBA). All data written to the platters of an FDE drive is automatically encrypted. Generally, when an end user receives a computer with an encrypted HDD, the HDD is encrypted with a default encryption key generated by the HDD supplier. Many end users may not trust the default encryption key that comes with their system and may want to generate their own encryption key. However, it can be prohibitively difficult for an end user to generate an encryption key and subsequently reconfigure their computer system.

BRIEF SUMMARY

In summary, one aspect provides an apparatus comprising: one or more processors; and one or more storage devices; wherein, responsive to execution of computer readable program code accessible to the one or more processors, the one or more processors are configured to: encrypt data utilizing one or more encryption keys, wherein data is initially encrypted utilizing a first encryption key; store the encrypted data on the one or more storage devices; provide for one or more secondary encryption keys to be generated; and respond to the one or more secondary encryption keys being generated by encrypting data utilizing the one or more secondary encryption keys, wherein access is maintained to data encrypted utilizing the first encryption key.

Another aspect provides a method comprising: encrypting data utilizing one or more encryption keys, wherein data is initially encrypted utilizing a first encryption key; storing the encrypted data on one or more storage devices; providing for one or more secondary encryption keys to be generated; and responding to the one or more secondary encryption keys being generated by encrypting data utilizing the one or more secondary encryption keys, wherein access is maintained to data encrypted utilizing the first encryption key.

A further aspect provides a computer program product comprising: a computer readable storage medium having computer readable program code embodied therewith, the computer readable program code comprising: computer readable program code configured to encrypt data utilizing one or more encryption keys, wherein data is initially encrypted utilizing a first encryption key; computer readable program code configured to store the encrypted data on the one or more storage devices; computer readable program code configured to provide for one or more secondary encryption keys to be generated; and computer readable program code configured to respond to the one or more secondary encryption keys being generated by encrypting data utilizing the one or more secondary encryption keys, wherein access is maintained to data encrypted utilizing the first encryption key.

For a better understanding of the embodiments reference is made to the following description, taken in conjunction with the accompanying drawings, and the scope of the invention will be pointed out solely in the appended claims.

DETAILED DESCRIPTION

Figure 1:
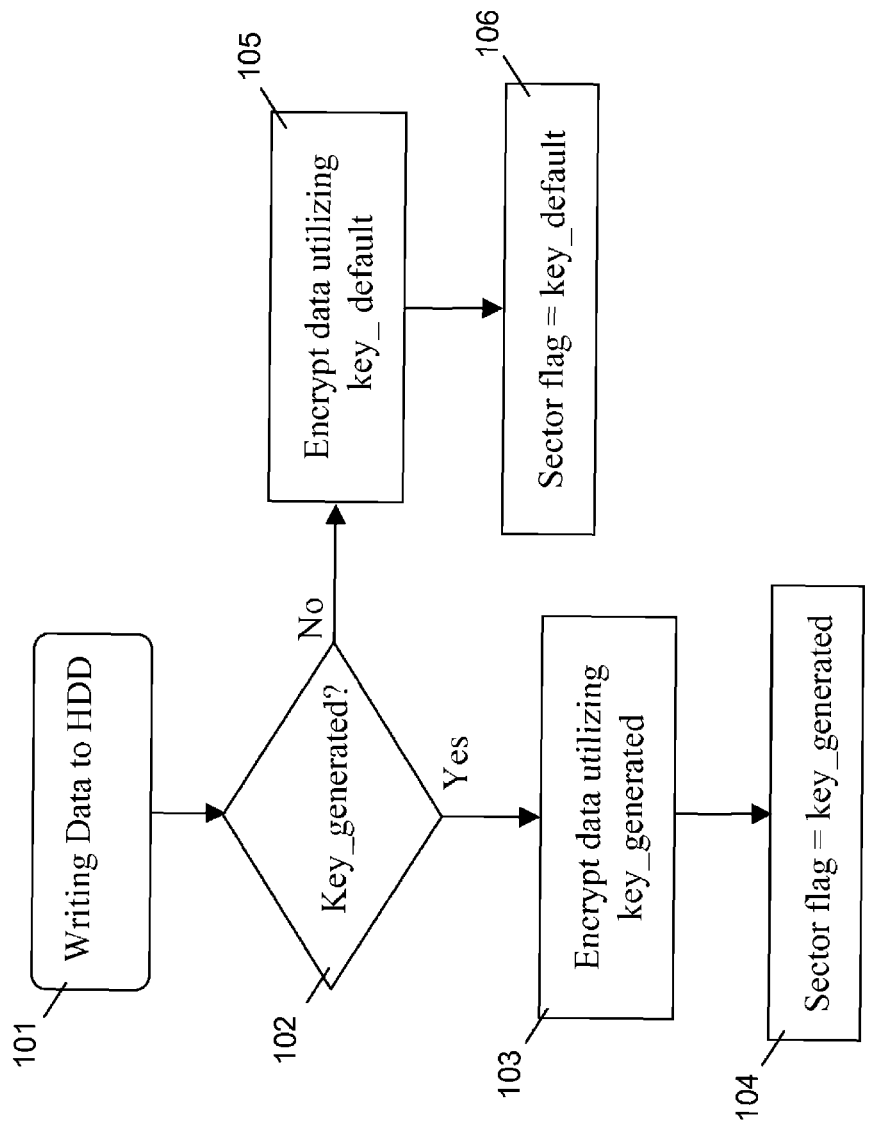
FIG. 1 illustrates an example of a method for writing encrypted data according to an embodiment.

It will be readily understood that the components of the embodiments, as generally described and illustrated in the figures herein, may be arranged and designed in a wide variety of different configurations in addition to the described embodiments. Thus, the following more detailed description of the embodiments, as represented in the figures, is not intended to limit the scope of the invention, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that aspects of the invention can be practiced without one or more of the specific details, or with other methods, components, materials, etc. In other instances, well-known structures, materials, or operations are not shown or described in detail to avoid obscuring aspects of the invention.

The illustrated embodiments will be best understood by reference to the figures. The following description is intended only by way of example, and simply illustrates certain embodiments of the invention as claimed herein.

Disk encryption is one of the most common and effective methods for achieving data security. In general terms, disk encryption involves converting data that is being stored on a disk into an encrypted form that is readable only by utilizing a key or password to decipher the data. There are several different methods for encrypting data, such as private key and public key, as well as levels of encryption, such as file encryption and full disk encryption. In addition, encryption may be hardware-based or may be administered by software.

Embodiments provide HDDs capable of storing at least two different encryption keys simultaneously and maintaining flags indicating the encryption key utilized to encrypt each HDD sector. Embodiments ensure that an end user may reconfigure the encryption key utilized by the computing system to encrypt data without causing a cryptographic erase of all of the HDDs contents. Thus, computer systems utilizing encryption methods consistent with the embodiments allow a user to generate a new encryption key for encrypting all data stored on the HDD from that point forward, while maintaining the default encryption key for accessing and maintaining data stored on the drive before generation of the new key.

Due to increasing data security considerations, there is an increasing demand for continued data encryption solutions. One example is Full Disk Encryption (FDE), which involves joining a standard Hard Disk Drive (HDD) with an encryption chip built into the HDD Printed Circuit Board Assembly (PCBA), wherein all data written to the platters of the FDE drive are automatically encrypted. In addition, there is also functionality that allows for cryptographic erase by simply changing the encryption key.

In most cases, a computer system's data encryption arrangement is set at the factory and the end user uses the system as configured by the manufacturer. A computer system or HDD manufacturer customarily generates and installs an encryption key for the computer system at its facility, using only one encryption key to encrypt the entire HDD. Often, the end user only has the option of using the encryption key generated by the manufacturer. In some cases the end user has the option of generating their own encryption key. However, this will result in a cryptographic erase in which all of the data on the drive encrypted by the 'default' key installed at the factory becomes unreadable. If an end user chooses this option, he has to go through the costly and time-consuming process of reinstalling the Operating System (OS), software applications, and drivers. In addition, once the end user has completed the installation, he must reconfigure the computer system to its previous operative state. Furthermore, if user data is on the computing system when the encryption key is generated, all of this data will have to be moved to another storage device and rewritten back to the drive after the reinstallation is complete.

A problem arises for many end users of encrypted computer systems. Many end users want to generate their own encryption key on-site, for example, because they do not feel secure with the default encryption key that comes with the system. This problem is especially important for businesses that do not generate their own custom images. However, as mentioned above, generating a new encryption key entails a costly and time-consuming process to reinstall the OS, software applications, and drivers, as well as moving and rewriting data currently stored on a HDD. This is especially true for end users, such as small or medium businesses, receiving multiple computer systems with default encryption keys generated by a manufacturer.

In view of the foregoing difficulties regarding providing data encrypted computer systems, embodiments are configured to allow end users to generate their own encryption keys without causing a cryptographic erase and while still maintaining full encryption functionality.

Embodiments provide for using two encryption keys to encrypt data instead of only one as is customarily used in the industry. According to embodiments, a default encryption key ("key_default") is generated and is initially used to encrypt data, while a second encryption key ("key_generated") is available for generation by an end user. Embodiments provide that data is encrypted with key_default until the user generates key_generated, after this event, all data is encrypted with key_generated. One embodiment is implemented in hardware, for example, using a HDD that can support two encryption keys. Another embodiment utilizes a software program that employs two encryption keys to achieve data encryption.

As illustrated in FIG. 1, data is encrypted according to an embodiment. When data is being written 101, whether key_generated has been created by the end user is determined 102. If key_generated has been created, then data is written utilizing key_generated as the encryption key 103. In addition, the sector where the data is written is flagged as being encrypted using key_generated 104. If key_generated has not been created, then data is written utilizing key_default as the encryption key 105 and the sector where the data is written is flagged as being encrypted using key_default 106.

A hardware implementation of an embodiment will serve as a non-limiting example, wherein a computer system is manufactured with a HDD that can support two encryption keys and the HDD has been preloaded at the factory and shipped to an end user. According to some embodiments, all factory preloaded data, including but not limited to the OS, preloaded software applications and driver files, are encrypted with key_default. When the end user wants to guarantee that data will be encrypted with key_generated and not key_default, the end user may utilize a command or specify and put in their own key. According to embodiments, when key_generated is created, the key change is only effective for data written after generation of key_generated. As such, data written before the generation of key_generated is still read using key_default. Thus, embodiments allow preloaded aspects of the computer system to function seamlessly while encrypting data written to the drive after an end user generates a second key that is distinct from the default key generated by the HDD or computer system manufacturer. As such, certain aspects ensure that the entire contents of a HDD are encrypted, while allowing a user to generate their own user key, avoid cryptographic erase, and avoid compromising the security provided by data encryption. In addition, embodiments allow an end user to have access to the entire HDD, but through the use of multiple keys.

According to embodiments, when the user generates the key_generated, a switch communicates to the drive to use key_generated to encrypt data from that point forward. In addition, embodiments provide that a switch may be in the form of a command sent to the drive from the OS.

Embodiments provide that every sector of the computing system HDD has a flag associated with it indicating whether the sector is encrypted with the default key or the generated key. As described earlier, this feature is illustrated in FIG. 1 through elements 104 and 106. Thus, in one embodiment, when a user receives a machine and generates their own encryption key, all new data written to the HDD will be encrypted with the generated key and when each sector is written, the sector flag will indicate that it must be read back with the key_generated instead of the key_default. In addition, embodiments provide that after the first time a user changes the encryption key, the key_default is never used to encrypt data again. However, the key_default may be used to read data written before the user generated a new encryption key.

Figure 2:
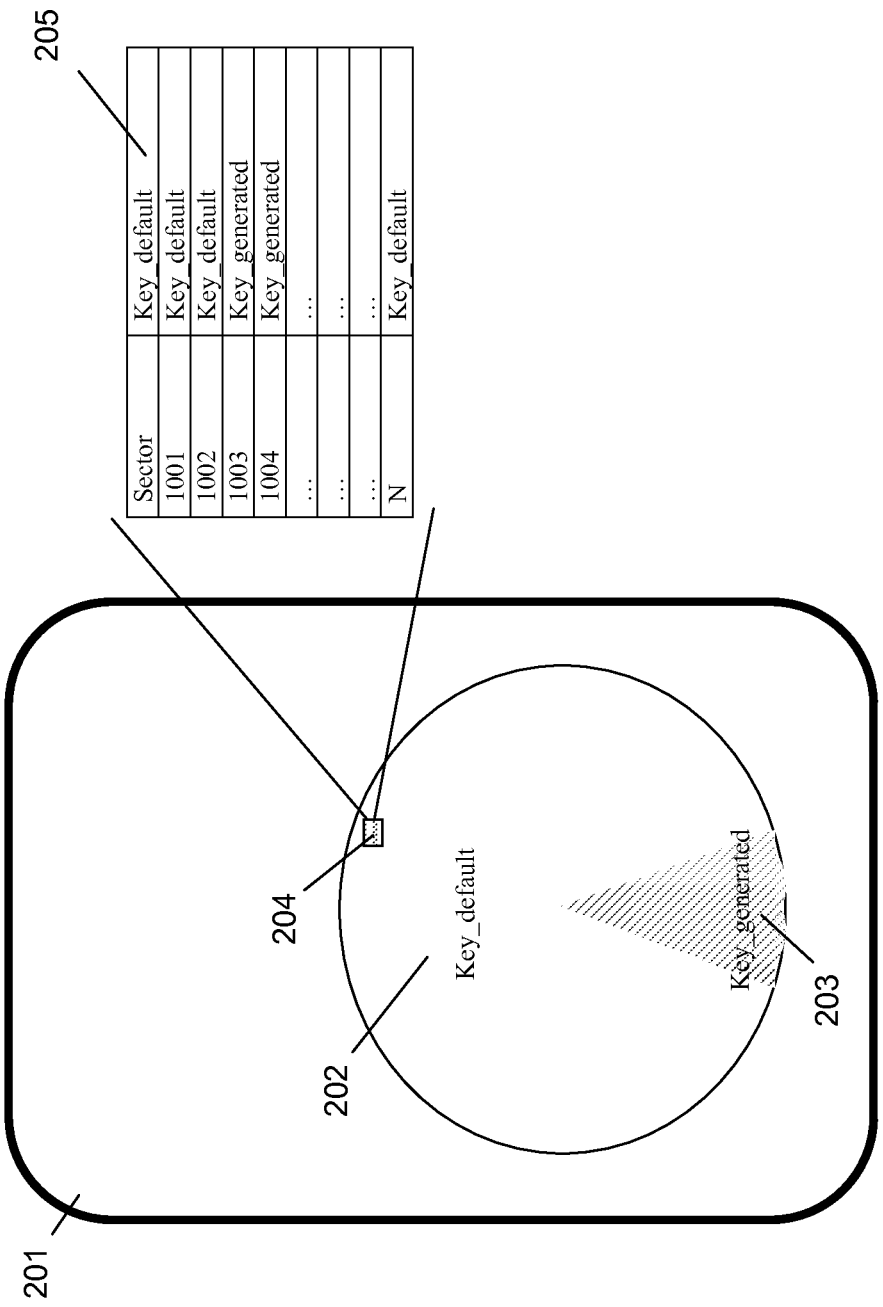
FIG. 2 illustrates an example of a HDD storing encrypted data and a sector-key table according to an embodiment.

Referring now to FIG. 2, there is depicted an embodiment wherein a HDD 201 is configured to store data utilizing two encryption keys. Certain sectors of the drive are encrypted using key_default 202, while other sectors are encrypted with key_generated 203. In addition, embodiments provide that the sector flags may be stored by a table and memory 205 and at some point the table may be stored on the HDD 204, such that the table would be kept with the drive and would have flags for each sector.

Figure 3:
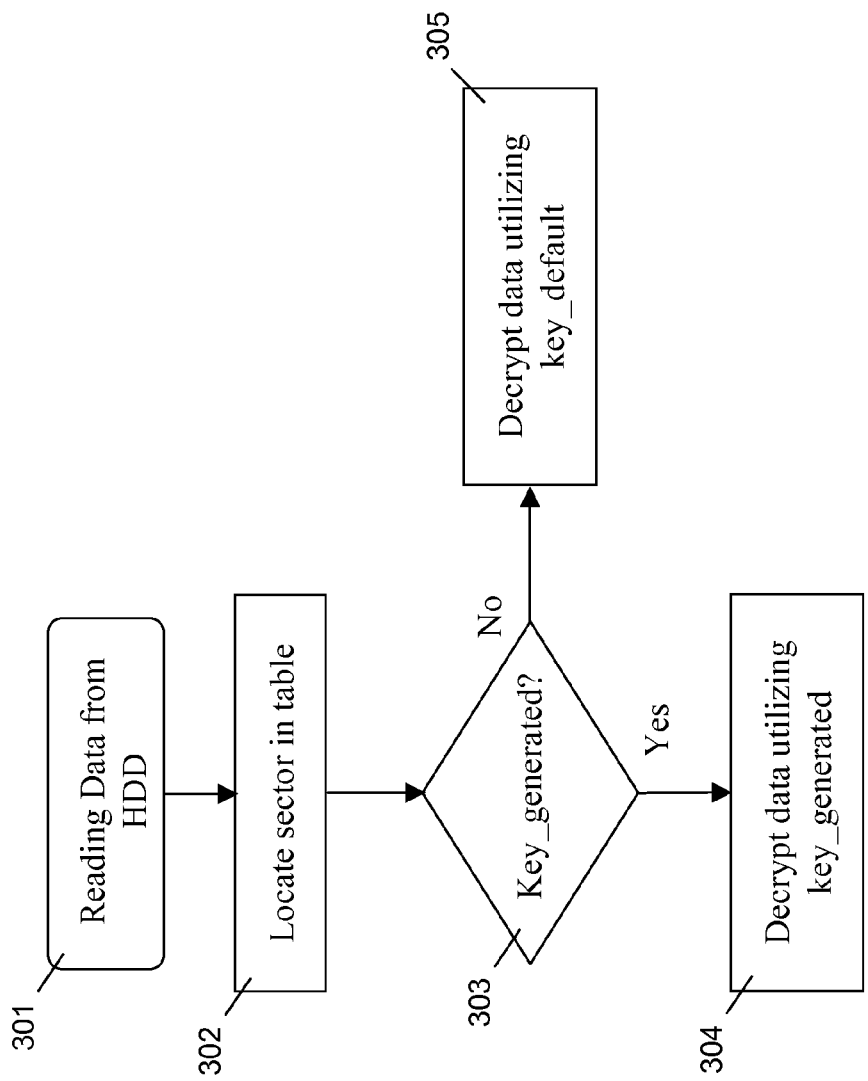
FIG. 3 illustrates an example of a method for reading encrypted data according to an embodiment.

FIG. 3 illustrates reading encrypted data according to an embodiment, wherein data is read from an encrypted HDD 301. The sector being read is located in the table storing the sectors and the corresponding encryption flags 302. Then, the encryption key used to encrypt data in the sector is determined 303. If the sector was encrypted using key_generated, then key_generated is used to decrypt the data 304. On the other hand, if the sector was encrypted using key_default, then key_default is used to decrypt the data 305.

As provided by the embodiments, after key_generated is created new writes to the drive will use the key_generated. As such, as OS files are updated, more of the drive will continue to be encrypted with key_generated over key_default. Thus, if the end user generates the user key immediately upon receiving the computer system, then all of the user data will be encrypted with key_generated and the computer system would maintain complete OS functionality without having to be reloaded. According to embodiments, after key_generated has been created, any change in the key will result in both the key_default and key_generated being erased (cryptographic erase) and then only one key will be used for encryption going forward. As such, embodiments provide that the default key is an initial condition that will not be repeated again in the computer system lifetime.

It will be understood by those having ordinary skill in the art that the embodiments can be utilized in connection with any number of devices taking advantage of encryption to secure data. A non-limiting example computer system that can store encrypted data according to the various embodiments is described below.

Figure 4:
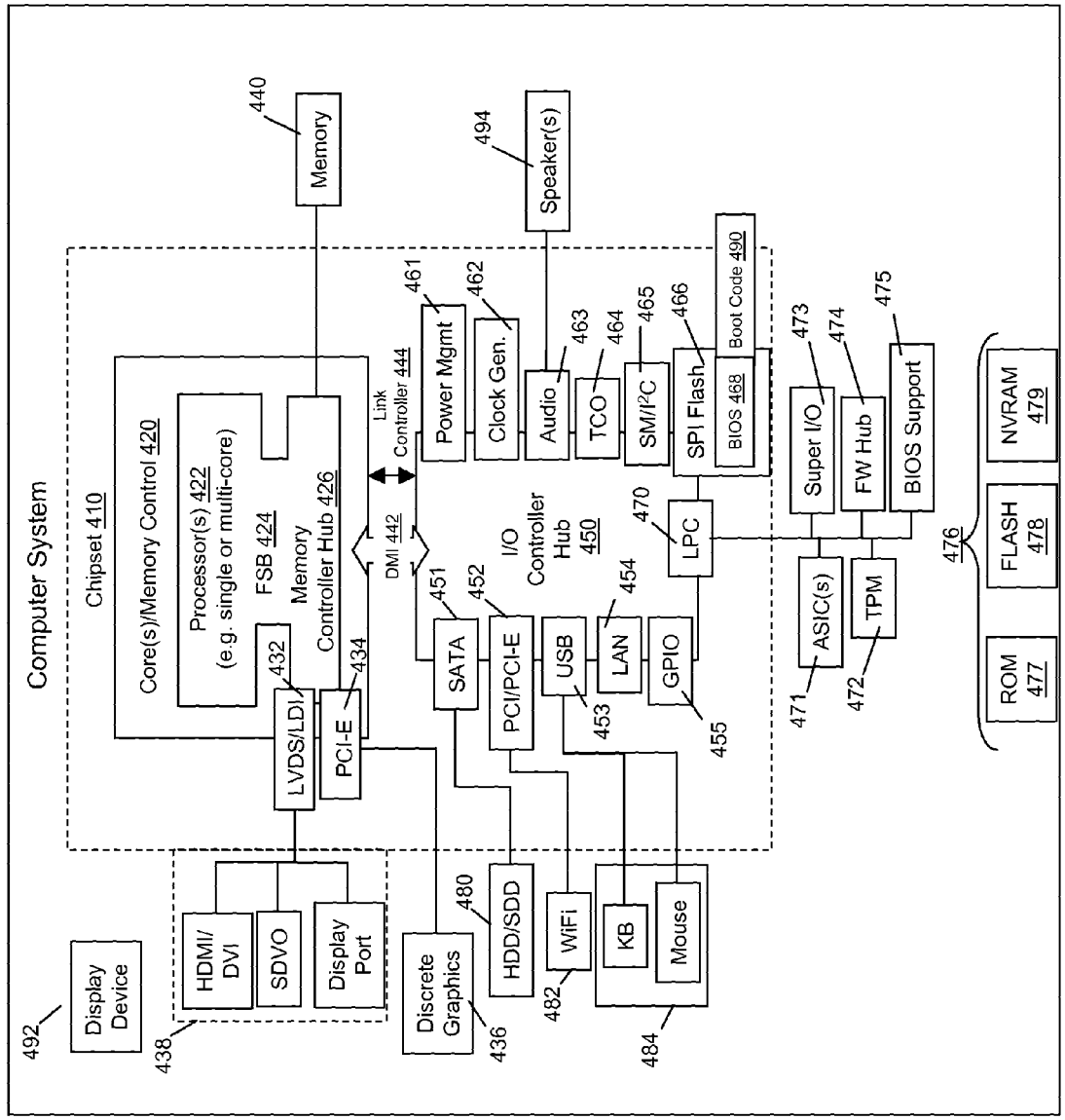
FIG. 4 illustrates an example of a computer system in which the methods described herein can be implemented.

While various circuits or circuitry may be utilized, FIG. 4 depicts a block diagram of an illustrative, example computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 4.

The computer system of FIG. 4 includes a so-called chipset 410 (a group of integrated circuits, or chips, that work together, chipsets) with an architecture that may vary depending on manufacturer (for example, INTEL®, AMD®, etc.). The architecture of the chipset 410 includes a core and memory control group 420 and an I/O controller hub 450 that exchange information (for example, data, signals, commands, et cetera) via a direct management interface (DMI) 442 or a link controller 444. The core and memory control group 420 include one or more processors 422 (for example, single or multi-core) and a memory controller hub 426 that exchange information via a front side bus (FSB) 424.

In FIG. 4, the memory controller hub 426 interfaces with memory 440 (for example, to provide support for a type of RAM that may be referred to as "system memory"). The memory controller hub 426 further includes a LVDS interface 432 for a display device 492 (for example, a CRT, a flat panel, a projector, et cetera). A block 438 includes some technologies that may be supported via the LVDS interface 432 (for example, serial digital video, HDMI/DVI, display port). The memory controller hub 426 also includes a PCI-express interface (PCI-E) 434 that may support discrete graphics 436.

In FIG. 4, the I/O hub controller 450 includes a SATA interface 451 (for example, for HDDs, SDDs, et cetera), a PCI-E interface 452 (for example, for wireless connections 182), a USB interface 453 (for example, for input devices 484 such as keyboard, mice, cameras, phones, storage, et cetera.), a network interface 454 (for example, LAN), a GPIO interface 455, a LPC interface 470 (for ASICs 471, a TPM 472, a super I/O 473, a firmware hub 474, BIOS support 475 as well as various types of memory 476 such as ROM 477, Flash 478, and NVRAM 479), a power management interface 461, a clock generator interface 462, an audio interface 463 (for example, for speakers 494), a TCO interface 464, a system management bus interface 465, and SPI Flash 466, which can include BIOS 468 and boot code 490. The I/O hub controller 450 may include gigabit Ethernet support.

The system, upon power on, may be configured to execute boot code 490 for the BIOS 468, as stored within the SPI Flash 466, and thereafter processes data under the control of one or more operating systems and application software (for example, stored in system memory 440). An operating system may be stored in any of a variety of locations and accessed, for example, according to instructions of the BIOS 468. As described herein, a device may include fewer or more features than shown in the system of FIG. 4.

It should be understood and appreciated that data encryption, as discussed and broadly contemplated herein, can be employed in any of a very wide variety of operating environments. Thus, while FIG. 4 presents a computer system by way of a possible operating environment for data encryption utilizing two encryption keys as broadly contemplated herein, it of course should be understood that this is provided by way of merely an illustrative and non-restrictive example.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   one or more processors; and
   one or more storage devices;
   wherein, responsive to execution of computer readable program code accessible to the one or more processors, the one or more processors are configured to:
     encrypt data utilizing one or more encryption keys, wherein data is initially encrypted utilizing a first encryption key;
     store the encrypted data on the one or more storage devices;
     provide for one or more secondary encryption keys to be generated;
     after the one or more secondary encryption keys are generated, encrypt new data utilizing the one or more secondary encryption keys;
     maintain both the first encryption key and the one or more secondary encryption keys, wherein access is maintained to the data encrypted utilizing the first encryption key;
     store an indicator indicating which of said first encryption key and said one or more of secondary encryption keys was used to encrypt data; and
     access encrypted data via selection and use of one or more of the first encryption key and the one or more secondary encryption keys.

2. The apparatus of claim 1, wherein to encrypt data utilizing one or more encryption keys is implemented utilizing a software application.

3. The apparatus of claim 1, wherein to encrypt data utilizing one or more encryption keys is implemented in hardware.

4. The apparatus of claim 1, wherein responsive to the one or more secondary encryption keys being generated, data encryption using the first encryption key is stopped and thereafter data is encrypted using the one or more secondary encryption keys.

5. The apparatus of claim 3, wherein the hardware is a hard disk drive having an encryption chip.

6. The apparatus of claim 1, further comprising:
one or more storage device storage segments on the one or more storage devices;
wherein, responsive to execution of computer readable program code, the one or more processors are further configured to:
associate the one or more storage device storage segments with a flag specifying the encryption key utilized to encrypt data in the one or more storage segments.

7. The apparatus of claim 6, wherein, responsive to execution of computer readable program code, the one or more processors are further configured to:
store the one or more storage segments and the flag associated with the one or more storage segments in a table;
read the encrypted data from the one or more storage devices, wherein reading the encrypted data comprises:
locating the one or more storage segments in the table; and
decrypting encrypted data utilizing the encryption key specified by the flag associated with the one or more storage segments.

8. The apparatus of claim 7, wherein the table is stored on the one or more storage devices.

9. The apparatus of claim 4, wherein generating the one or more secondary encryption keys involves communicating a switch to the one or more storage devices.

10. The apparatus of claim 1, wherein after a first secondary encryption key has been generated, the generation of another secondary encryption key causes a cryptographic erase by deletion of the first encryption key.

11. A method comprising:
encrypting data utilizing one or more encryption keys, wherein data is initially encrypted utilizing a first encryption key;
storing the encrypted data on one or more storage devices;
providing for one or more secondary encryption keys to be generated;
after the one or more secondary encryption keys are generated, encrypting new data utilizing the one or more secondary encryption keys;
maintaining both the first encryption key and the one or more secondary encryption keys, wherein access is maintained to the data encrypted utilizing the first encryption key;
storing an indicator indicating which of said first encryption key and said one or more of secondary encryption keys was used to encrypt data; and
accessing encrypted data via selection and use of one or more of the first encryption key and the one or more secondary encryption keys.

12. The method of claim 11, wherein encrypting data utilizing one or more encryption keys is implemented utilizing a software application.

13. The method of claim 11, wherein encrypting data utilizing one or more encryption keys is implemented in hardware.

14. The method of claim 11, wherein responsive to the one or more secondary encryption keys being generated, data encryption using the first encryption key is stopped and thereafter data is encrypted using the one or more secondary encryption keys.

15. The method of claim 13, wherein the hardware is a hard disk drive having an encryption chip.

16. The method of claim 11, further comprising:
determining one or more storage segments on the one or more storage devices; and
associating the one or more storage segments with a flag specifying the encryption key utilized to encrypt data in the one or more storage segments.

17. The method of claim 16, further comprising:
storing the one or more storage segments and the flag associated with the one or more storage segments in a table;
wherein reading the encrypted data from the storage device comprises:
locating the one or more storage segments in the table; and
decrypting the encrypted data utilizing the encryption key specified by the flag associated with the one or more storage segments.

18. The method of claim 17, wherein the table is stored on the one or more storage devices.

19. The method of claim 11, wherein generating the one or more secondary encryption keys involves communicating a switch to the storage device.

20. A computer program product comprising:
a computer readable storage medium having computer readable program code embodied therewith, the computer readable program code comprising:
computer readable program code configured to encrypt data utilizing one or more encryption keys, wherein data is initially encrypted utilizing a first encryption key;
computer readable program code configured to store the encrypted data on the one or more storage devices;
computer readable program code configured to provide for one or more secondary encryption keys to be generated;
computer readable program code configured to, after the one or more secondary encryption keys are generated, encrypt new data utilizing the one or more secondary encryption keys;
computer readable program code configured to maintain both the first encryption key and the one or more secondary encryption keys, wherein access is maintained to the data encrypted utilizing the first encryption key;
computer readable program code configured to store an indicator indicating which of said first encryption key and said one or more of secondary encryption keys was used to encrypt data; and
computer readable program code configured to access encrypted data via selection and use of one or more of the first encryption key and the one or more secondary encryption keys.

* * * * *